June 7, 1932.  H. A. CUMFER  1,862,256
MACHINE FOR PROVIDING LAMINATED FIBROUS STRUCTURES WITH OFFSET EDGES
Filed March 12, 1930
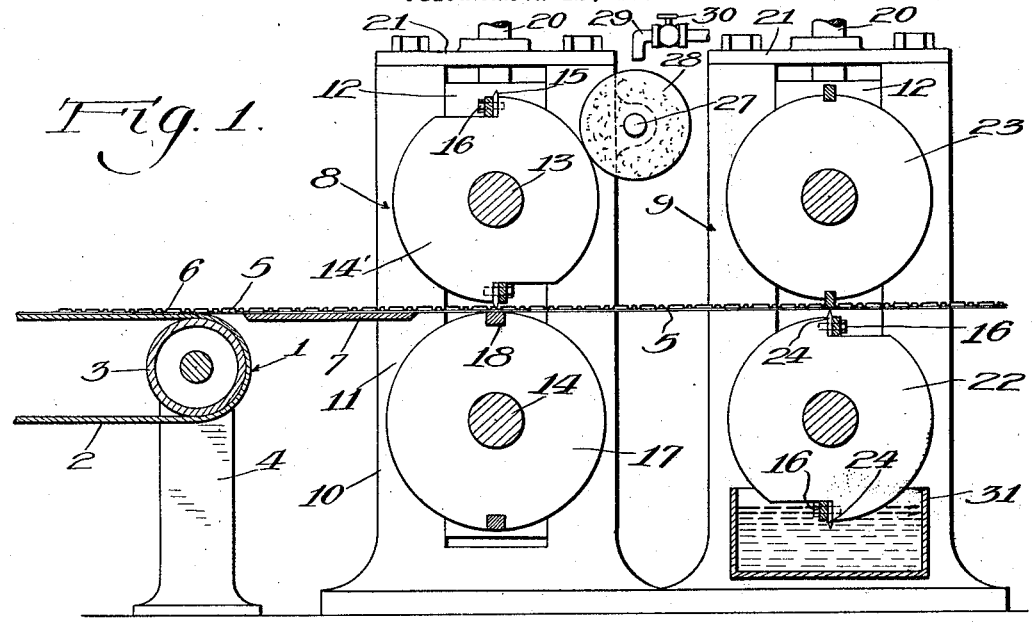
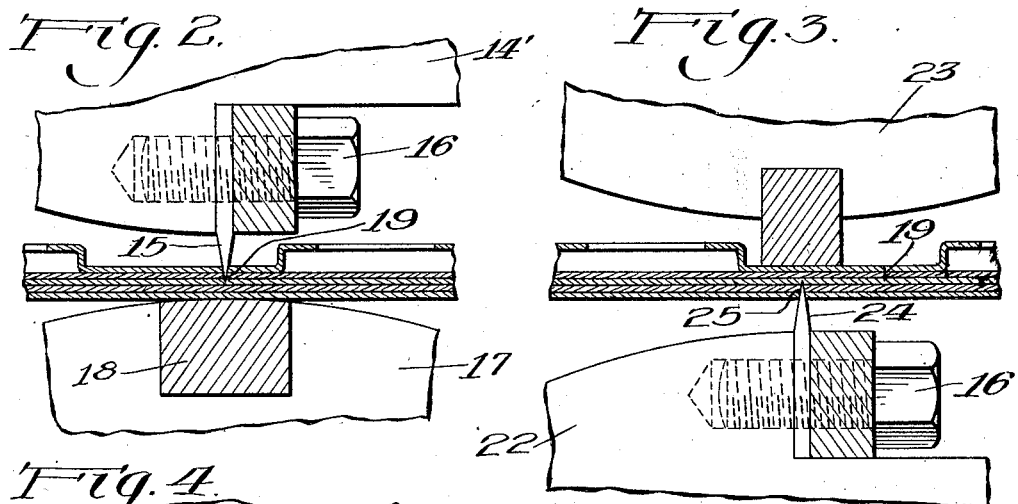
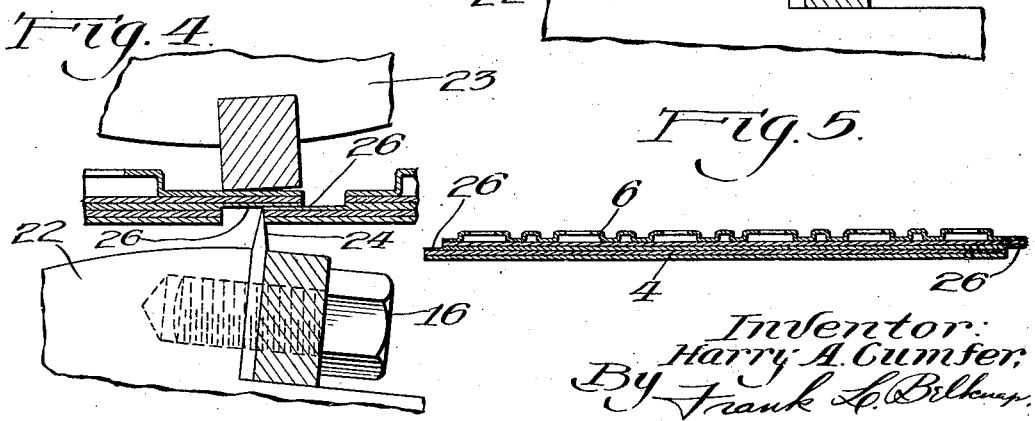
Inventor:
Harry A. Cumfer,
By Frank L. Belknap.
Atty.

Patented June 7, 1932

1,862,256

UNITED STATES PATENT OFFICE

HARRY A. CUMFER, OF CHICAGO, ILLINOIS, ASSIGNOR OF ONE-HALF TO WILLARD J. MASON, OF GREENWICH, CONNECTICUT

MACHINE FOR PROVIDING LAMINATED FIBROUS STRUCTURES WITH OFFSET EDGES

Application filed March 12, 1930. Serial No. 435,103.

This invention relates to improvements in a machine for cutting and severing laminated board, and refers particularly to a machine designed for transversely cutting and severing a continuously moving laminated structure to form transverse overlapping edges thereon.

In the use of a laminated fibrous structure for building board, plaster receiving board or the like, wherein units of board are laid to form a wall or ceiling or are used as a plaster receiving base for a wall or ceiling, difficulty is often experienced in properly joining the various units to adjacent units to form a smooth wall. This is particularly true in the event that plaster is to cover the boards, because of the fact that there is no interlocking means between adjacent units, inasmuch as the ends of said adjacent units abut each other, but do not overlap. Hence, if one unit were laterally displaced with respect to an adjacent unit the plaster would tend to crack at the juncture of said units.

Accordingly, one of the important features of my invention comprises means for cutting and severing a laminated fibrous board in such a manner as to provide a board having transversely offset, overlapping edges. Thus, a board may be produced which may be laid to form a wall or ceiling, the edges of adjacent units comprising said wall or ceiling overlapping at their junctures, forming a so-called "ship lap".

The invention briefly described comprises a pair of cutting units, each unit comprising a cutting roll and a cooperating bed roll. Each cutting roll may have a knife or plurality of knives mounted upon its periphery, the circumferential distance between adjacent knives determining the length of the board. The laminated board to be cut may be fed to the first cutting unit, the blade of the cutting roll being so adjusted that only the upper laminæ are severed. The board may then be passed to a second unit of similar construction to the first cutting unit, except that the cutting roll is mounted upon the opposite or under side of the board and that the cutting roll may be of larger diameter than the first cutting roll. The board in passing through the second unit may then be cut from the bottom, the knives being adjusted so that the remaining laminæ not cut by the first roll will be cut by the second. The angular position of the knives upon the two rolls may be adjusted relative to each other so that the cuts produced by the respective knives will be offset relative to each other. By the provision of a second cutting roll of larger diameter than the first, with the same angular or rotative speed, the second cutting roll will have a greater peripheral speed. Hence, in making the second cut, the knife will not only cut the lower laminæ but will also split said laminæ in a plane parallel to the plane of the board and from the second to the first cut, thereby forming an overlapping edge.

It is to be understood, of course, that both cutting rolls may be constructed to form one unit, in which case each cutting roll will serve both as a cutting roll and as a bed roll.

Other and further important features of my invention will be apparent from the accompanying drawing and following detail description.

In the drawing, Fig. 1 is an elevational view illustrating particularly my novel cutting units.

Figs. 2, 3 and 4 illustrate sequential phases in the cutting operation, Fig. 2 showing the initial cut, Fig. 3 the secondary cut and Fig. 4 the splitting action of the secondary cutting knife.

Fig. 5 is a sectional view of the board cut by my device.

Referring more in detail to the drawing, 1 indicates the rear of a conventional conveyor, comprising a belt 2 which travels over pulley 3 supported by a frame 4. A machine (not shown) for continuously and adhesively uniting a plurality of individual sheets of fibrous material to produce a laminated fibrous structure 5 may be positioned adjacent the forward end of the conveyor 1. Said machine, if desired, may produce a corrugated upper sheet 6 upon the laminated base sheet 5. The board issuing from said machine passes to the conveyor belt 2 and is transported thereby a suitable distance to permit the adhesive which unites the individual laminæ to set. Upon passing from the conveyor belt 2 the board 5 may continue to move over a platform 7 disposed adjacent the end of the conveyor 1. The said platform may be adapted to support the board 5 in its travel from the conveyor to cutting units 8 and 9.

The cutting unit 8 may comprise a frame 10 consisting of two vertical guide portions 11 between which bearing blocks 12 may be slidably positioned. Transverse shafts 13 and 14, upper and lower shafts, respectively, may be journalled at each end in the slidable blocks 12. The upper shaft 13 may support a cutting roll 14' upon the periphery of which may be mounted one or more longitudinally positioned cutting blades 15, the cutting blades being removably fastened by means of screws or the like 16. A bed roll 17 may be mounted upon the lower shaft 14 and may be provided with one or more longitudinally positioned supporting segments 18. The number and angular position of segments 18 upon the roll 17 may correspond to the number and angular position of knives 15 disposed upon the surface of the roll 14'.

The board 5 may pass from the supporting platform 7 to a position intermediate the cutting roll 14' and bed roll 17 wherein one of the knives 15 cuts into the upper surface of said laminated board. The cutting action of the knife 15 is shown best at 19 in Fig. 2. By suitably positioning the shaft 13 with respect to the shaft 14 the depth of the cut 19 may be accurately regulated. This adjustment may be readily accomplished by manipulating an operating screw 20 threadedly positioned in cross member 21 at the head of frame 10. The screw 20 may be turned by a hand wheel or the like (not shown). Hence, it can be seen that, by suitably adjusting the relative positions of the shafts 13 and 14 with respect to each other, the cut 19 may be produced to any desired depth into the laminated board 5.

The board 5 may pass from unit 8 to secondary cutting unit 9. Cutting unit 9 may be similar in construction to unit 8, with the exception that the cutting roll 22 may be positioned on the opposite side of the board 5 to cutting roll 14', and similarly, bed roll 23 may be positioned upon the opposite side of the board to the bed roll 17. The knives 24 cut the board 5 from the lower surface thereof upwardly to an intermediate laminæ thereof, producing a cut 25. The angular adjustment of the roll 14' with respect to the roll 22 may be such that the cuts 19 and 25 will be offset with respect to each other and the depth of the cuts 19 and 25 may be such that they both terminate in a common intermediate lamina.

As a feature of my invention, the secondary cutting roll 22 may be of slightly larger diameter than the primary cutting roll 14', and inasmuch as the rolls 14', 17, 22 and 23 may all have the same angular velocity, the peripheral speed of the roll 22 will be in excess of the peripheral speeds of the remaining rolls and will also be greater than the speed of translation of the board 5. Hence, relative motion may exist between the periphery of the cutting roll 22 and the peripheries of the remaining rolls, and consequently relative motion may exist between the periphery of the roll 22 and the board 5. Therefore, it can be readily seen that immediately subsequent to the formation of the cut 25 the knife 24 may exert a lateral thrust upon the lower cut laminæ of the board 5. The resultant action from this thrust is that the commonly cut lamina, that is, the lamina cut by both primary and secondary cutting rolls, will be split in a plane parallel to the surface of the board, thereby producing offset edges 26.

In cutting a laminated structure adhesively united by a substance of the character of asphalt, or the like, unless the adhesive is perfectly dry and has sufficiently set, poor cuts at 19 and 25 may result. To obviate this condition a shaft 27 journalled upon the frame 10 may support a roll 28 of soft pliable material such as felt or the like. The roll 28 may be moistened by water or other suitable liquid which may drip thereon from a pipe 29, controlled by valve 30. The knives 15 in their rotation contact the pliable roll 28 and embed themselves therein, thereby completely coating the knife surface with the liquid with which said roll 28 is saturated. The periphery of the roll 22 may pass through a trough 31 which may contain a sufficient quantity of liquid to wet and wash the knives 24 or, if desired, another roll (not shown) similar to the roll 28 may be disposed adjacent the roll 22 and may function in a manner similar to the roll 28.

Although I have shown a device wherein the first or primary cut is produced from above and the secondary cut and severing action is produced from below, it is to be understood that this operation may be performed in the inverse order, that is, the primary cut may be produced from below and the secondary cut and lateral thrust may be produced from above.

It is apparent that herein is provided a device for cutting a laminated board to form a unitary laminated structure having offset or overlapping transverse edges. The device is extremely simple to operate, and in addition is efficient and ideally adapted for the economical cutting of offet edges of the character described.

I am aware that many changes may be made without departing from the spirit of the invention, for instance, the form of the knives may be changed; their relative placement with respect to each other may be altered; the depths of the cuts may be varied and the width of the offsets may be changed, all of which in addition to many other changes in construction and operation are contemplated by my invention.

While I have illustrated the fibrous structure as taking the form of a multi-ply base sheet and a corrugated upper ply, it is to be understood that the machine is not limited to use with a board having a corrugated upper ply. The machine is designed for use in the cutting and severing of any kind of a multi-ply or laminated fibrous structure to produce off-set edges.

I claim as my invention:

1. A mechanism for cutting and severing a continuously moving laminated fibrous structure to produce oppositely disposed off-set edges thereon, comprising in combination means for feeding a continuous laminated strip, rotary cutting means acting on said laminated strip to cut from spaced points on both surfaces of said strip to a common intermediate lamina, and means for driving one of said cutting means at a peripheral speed in excess of the linear feed of the strip for splitting said intermediate lamina from one cut to the other cut and thus completely severing a unit from said continuous strip.

2. A mechanism for cutting and severing a continuous laminated fibrous strip to produce off-set edges on said severed units, comprising in combination, means for feeding a continuous laminated strip, rotary cutting means acting on said strip to cut thereinto from both surfaces of said strip to a common lamina, said cutting means being relatively disposed to slightly off-set one cut from the other, and means for driving one of said cutting means at a peripheral speed in excess of the linear feed of the strip for splitting said common intermediate lamina from one cut to the other and thus completely severing individual units from said continuous strip.

3. A mechanism for cutting laminated fibrous structures to produce oppositely disposed off-set edges thereon, comprising a primary cutting element for cutting a plurality of the laminæ from one side to an intermediate lamina, a secondary rotary cutting element for cutting the remaining laminæ from the opposite side of said laminated structure to the same intermediate lamina, and means for driving said secondary cutting element at a peripherial speed in excess of the linear feed of the strip for splitting said intermediate lamina from the second cut to the first cut to thereby completely sever an individual unit from said strip.

4. A mechanism for cutting laminated fibrous structures to produce oppositely disposed offset edges thereon comprising a primary cutting element for cutting a plurality of the laminæ from one side to approximately the center of an intermediate lamina, a secondary cutting element for cutting the remaining laminæ from the opposite side of said laminated structure to approximately the center of the intermediate lamina and means for driving said secondary cutting element in the direction of motion of the strip at a greater speed than the strip and splitting said intermediate lamina from the second cut to the first cut to thereby completely sever an individual unit from said strip.

5. A mechanism for cutting laminated fibrous structures to produce oppositely disposed off-set edges thereon, comprising a primary cutting roll for cutting a plurality of the laminæ from one side of said laminated structure to an intermediate lamina, a secondary cutting roll of larger diameter than the primary roll for cutting the remaining laminæ from the opposite side of said structure to the said intermediate lamina, and means for synchronizing the angular motion of both of said cutting rolls and thereby splitting said intermediate lamina from the second cut to the first cut.

6. A mechanism for cutting laminated fibrous structures to produce oppositely disposed off-set edges thereon, comprising a primary cutting roll for cutting a plurality of the laminæ from one side of said structure to an intermediate lamina, and a synchronously rotating secondary cutting roll of larger diameter for cutting the remaining laminæ from the opposite side of said structure to the same intermediate lamina to thereby split said intermediate lamina from the second cut to the first cut and completely sever an individual unit from said structure.

7. A device for cutting units from a continuously advancing laminated strip and producing off-set cut edges thereon, comprising in combination, a primary cutting roll for cutting a plurality of the laminæ from one side of said strip to an intermediate lamina, a secondary cutting roll of relatively larger diameter for cutting the remaining laminæ from the opposite side of said strip to the same intermediate lamina rotating in timed relationship with the primary cutter, and thereby maintaining the peripheral speed of the secondary cutting roll in excess of the speed of translation of the moving strip.

In testimony whereof I affix my signature.

HARRY A. CUMFER.